United States Patent [19]

Matuschek et al.

[11] 4,177,710
[45] Dec. 11, 1979

[54] BLIND FASTENER

[75] Inventors: Josip Matuschek, Newport Beach; Rene' A. Chister, Costa Mesa, both of Calif.

[73] Assignee: Townsend Textron, Santa Ana, Calif.

[21] Appl. No.: 820,156

[22] Filed: Jul. 29, 1977

Related U.S. Application Data

[63] Continuation-in-part of Ser. No. 807,366, Jun. 17, 1977, abandoned.

[51] Int. Cl.² .............................................. F16B 13/04
[52] U.S. Cl. ........................................... 85/70; 85/77
[58] Field of Search .................. 85/70, 72, 73, 74, 77, 85/80

[56] References Cited

U.S. PATENT DOCUMENTS

| 2,030,167 | 2/1936 | Miller | 85/70 |
| 2,030,171 | 2/1936 | Huck | 85/70 X |
| 2,061,628 | 11/1936 | Huck | 85/70 X |
| 2,803,984 | 8/1957 | Swenson | 85/70 X |
| 4,007,659 | 2/1977 | Stencel | 85/70 |
| 4,012,984 | 3/1977 | Matuschek | 85/70 |

FOREIGN PATENT DOCUMENTS 1413592 11/1975 United Kingdom ........................ 85/70

Primary Examiner—J. Franklin Foss
Attorney, Agent, or Firm—Harvey C. Nienow

[57] ABSTRACT

A blind fastener capable of providing a strong fastening force on workpieces whose composite thickness may vary from minimum to maximum within a predetermined range. It comprises a tubular sleeve and pulling mandril therewithin, such mandril having a head which is pulled against the blind end of the sleeve to cause the same to be crimped or upset against the blind side of the workpieces. The sleeve is formed with a tapered end portion which varies from maximum wall thickness at the blind end thereof to minimum thickness intermediate the length of the sleeve. The mandril is formed with a complementally-shaped taper which varies from the head of the mandril to a point intermediate the length thereof.

2 Claims, 7 Drawing Figures

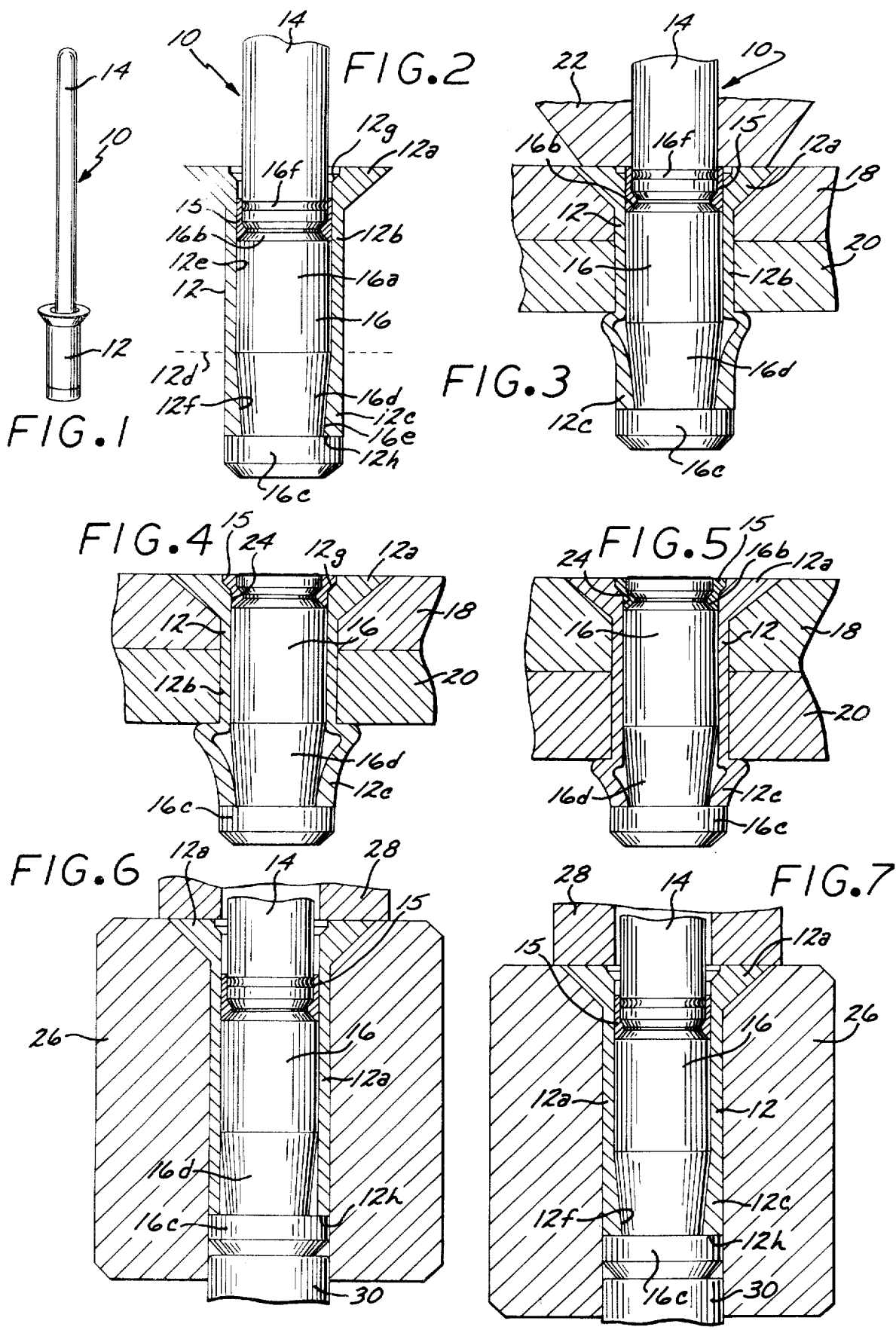

BLIND FASTENER

This application is a continuation-in-part of application Ser. No. 807,366, filed June 17, 1977 now abandoned by Josip Matuschek and René Augusto Chister for BLIND FASTENER AND METHOD FOR MAKING SAME, to be abandoned upon receipt of the filing receipt for this continuation-in-part application.

The present invention relates generally to blind fasteners and to a method of making same, but more particularly to such fasteners and method whereby strong anchoring or clamping of such fasteners can be provided.

Many different types and styles of blind fasteners have heretofore been provided, substantially all of them enabling two or more workpieces to be fastened together from only one side. That is, a blind fastener, virtually by definition, is such that the several workpieces can be firmly secured together when only one side of such workpieces is accessible.

Heretofore, substantially all blind fasteners have been capable of providing a firm and secure anchor in workpieces whose composite thickness falls within extremely small tolerance. That is, prior fasteners of this type have been capable of firmly clamping together a predetermined thickness of workpieces, but if such thickness is smaller, the result is an extremely loose clamping fastener. Conversely, if the composite thickness is too great, the fastener is incapable of gripping the material at all.

Some exceptions to this are shown in U.S. Pat. No. 2,030,167 to Miller for "RIVET" and U.S. Pat. No. 3,253,495 to Orloff for "HARDENED BLIND BOLT WITH ANNEALED SHANK PORTION". However, even these special types of blind fasteners have not been capable of providing a strong clamping or anchoring effect in workpieces whose composite thickness may fall within a relatively wide range of thickness limits. As such, even these prior devices have not been capable of optimizing the solution to the instant problem.

In view of the foregoing, it is an object of the present invention to provide a blind fastener which is capable of generating the strongest clamping or anchoring forces on workpieces of composite thickness within predetermined limits thereof.

Another object of the present invention is to provide a blind fastener as characterized above whose clamping operation is varied in accordance with the composite thickness of the workpieces to be clamped.

Another object of the present invention is to provide a blind fastener as characterized above which utilizes an upsetting or crimping function which is controlled such that it occurs immediately adjacent the blind workpiece regardless of the composite thickness of the several workpieces.

A still further object of the present invention is to provide blind fasteners as characterized above, a single device of which is operable to effectively clamp workpieces whose composite thickness varies within an extremely wide range of limits.

An even further object of the present invention is to provide the method of making a blind fastener as characterized above, wherein such method involves the step of tapering a portion of the sleeve of the blind fastener.

A still further object of the present invention is to teach the method of making a blind fastener as characterized above wherein a mandril is formed with a tapered surface and is positioned within the sleeve, said sleeve being inserted into a die and a force applied to the sleeve and mandril to re-form the sleeve to conform to such tapered surface on the mandril.

A still further object of the present invention is to provide a blind fastener as characterized above which is simple and inexpensive to manufacture and which is rugged and dependable in operation.

The novel features which we consider characteristic of our invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 1 is a perspective view of a blind fastener according to the present invention;

FIG. 2 is a fragmentary longitudinal sectional view of the fastener of FIG. 1;

FIG. 3 is a view similar to FIG. 2 showing the fastener in process of installation;

FIG. 4 is a longitudinal sectional view showing the subject fastener on workpieces of relatively small composite thickness;

FIG. 5 is a view similar to FIG. 4 showing the fastener on workpieces of maximum composite thickness;

FIG. 6 is a longitudinal sectional view showing a step in the method of making the subject fastener; and FIG. 7 is a view similar to FIG. 6 showing a later step in such method.

Like reference characters indicate corresponding parts throughout the several views of the drawings.

Referring to FIG. 1 of the drawings, there is shown therein a blind fastener 10 having a sleeve 12 and a shank 14.

As shown most particularly in the other views of the drawings, the sleeve 12 is formed with a head 12a, an intermediate portion 12b of substantially uniform wall thickness as well as internal and external diameters, and a blind end portion 12c which is formed with a generally tapered wall thickness.

The head 12a of sleeve 12 may take substantially any appropriate form or configuration, but is shown in the drawings as being frusto-conical for insertion within a complementarily formed countersink as will hereinafter be shown. The uniform cross-section of intermediate portion 12b extends to approximately the broken line 12d shown in FIG. 2, the internal diameter 12e of the sleeve thereafter tapering as shown at 12f. From the cross-sectional position indicated by line 12d to the end 12f of the sleeve, the internal diameter 12f decreases, thus providing a heavier wall thickness at 12h and a lighter wall thickness at 12d.

The head 12a is undercut at 12g to receive a locking ring 15 as will hereinafter be explained in greater detail.

The shank 14 carries a mandril 16 having an intermediate portion 16a whose outside diameter is uniform from the cross-section represented by broken line 12d to an annular cutout 16b. The blind end portion of mandril 16 is formed with an annular head 16c whose outside diameter closely matches and conforms to the outside diameter of sleeve 12. The mandril 16 between intermediate portion 16a and head 16c is tapered as shown at 16d to provide a frusto-conical exterior surface 16e whose greatest diameter is at the cross-section at line 12d and whose minimum diameter is adjacent head 16c.

As shown in FIG. 3, the fastener 10 is inserted in appropriate aligned openings in workpieces 18 and 20. It is anchored in place in a well-known manner, with the use of a conventional setting or pulling tool (not shown) whereby an anvil 22 is placed against the upper surface of head 12a. The stem 14 is pulled by the tool, the reaction force being applied to the anvil 22.

As shown in FIG. 3, the side wall of sleeve 12 is caused to crimp, upset or collapse against the blind side of workpiece 20 to thereby provide gripping or anchoring of the fastener as shown most particularly in FIGS. 4 and 5 of the drawings.

As the side wall of the sleeve 12 continues to collapse, a point is reached where the arcuate cutout or groove 16b approaches the undercut 12g in head 12a, and the top end of the locking ring 15 is pulled against the anvil 22. Continued motion of the stem forms the ring into the undercut 12g and completes the collapse of the sleeve against the workpiece 20 as shown in FIGS. 4 and 5. At substantially the same time, the break point 16f on mandril 16 reaches a point of substantial alignment with the surface of workpiece 18 and, due to the build-up of tensile force thereat breaks, permitting the shank 14 to be disposed of.

The tapered wall 12c of sleeve 12 is a control element, for controlling the way in which the wall of the sleeve collapses against the blind side of the workpiece 20. That is, as contrasted in FIGS. 4 and 5 of the drawings, if the composite thickness of workpieces 18 and 20 is minimal, the wall of sleeve 12 commences to collapse or crimp slightly beyond the blind surface of workpiece 20. In similar fashion, if the workpieces 18 and 20 are of maximum composite thickness as shown in FIG. 5, the wall of sleeve 12 commences to collapse slightly beyond the blind surface of workpiece 20. Also, for any composite thickness between such extremes, a similar result is obtained, namely that the collapsing or crimping takes place immediately beyond the blind wall or surface of workpiece 20.

This result is obtained due to various things. Most predominant is the fact that the wall thickness of sleeve 12 increases at a graduated or controlled rate from the minimum thickness collapsing location toward the maximum thickness collapsing location, the thicker the wall the stiffer and more resistant it is to collapsing. Thus, for any composite thickness of workpieces within a given range the crimping or anchoring function of the sleeve is optimum.

As shown in FIGS. 6 and 7 of the drawings, the subject blind fastener 10 is formed in a special method.

Initially, the mandril 16 is formed or shaped by any appropriate method as by machining, forging or the like. The tapered portion 16d is thereby provided, as are the various other features of the mandril such as head 16c and annular cutouts 16b and 16f.

In like fashion the sleeve 12 is formed as by cold-working or the like, except that the tapered wall thickness or internal diameter as shown at 12c and 12f are not included. That is, as shown most clearly in FIG. 6 of the drawings, the sleeve diameter is uniform.

The locking ring 15, being made of contoured wire, is wrapped around the mandril 16 to form a split circular ring as shown and described in U.S. Pat. No. 4,012,984 issued Mar. 22, 1977 in the name of one of the co-inventors herein, Josip Matuschek.

The mandril 16 is then positioned within the sleeve 12 and the assembly is then placed within the through opening of a die 26.

Opposite forces are applied to the assembly through the use of an appropriate press (not shown) having members 28 and 30. Member 28 is placed against the sleeve 12 as shown in FIG. 6, and the member 30 is placed against the head 16c of mandril 16. A compressive force is applied to the assembly through members 28 and 30.

This causes the end portion of sleeve 12 to be reformed such that the internal diameter of the sleeve is caused to conform to the external diameter of tapered portion 16d of mandril 16. This is shown in FIG. 7 and provides a tapered end portion 12c which varies to maximum wall thickness at the end 12f, as shown.

It will be noted that this method of making a blind fastener causes the sleeve and mandril to be effectively connected together, providing a unit which is easier to handle and which does not separate into several pieces when being inserted into aligned openings in the workpieces.

It is thus seen that the present invention provides a blind fastener and method for making same, whereby the fastener is capable of firmly gripping workpieces whose composite thickness may be within very wide limits. Although we have shown and described certain specific embodiments of our invention, we are well aware that many modifications thereof are possible. The invention, therefore, is not to be restricted except insofar as is necessitated by the prior art and by the language of the appended claims.

We claim:

1. A fastener for firmly securing together workpieces of composite thickness ranging from a predetermined minimum to a predetermined maximum comprising in combination, a tubular sleeve having a head at one end and adapted to extend through aligned openings in said workpieces with said head abutting one of said workpieces, and a mandril having a cylindrical body within said tubular sleeve and formed with a head on said body in engagement with the other end of said sleeve, said tubular sleeve being formed with a uniform outside diameter throughout its length and with a uniform fixed inside diameter from said head to approximately the point on said sleeve of said predetermined minimum composite workpiece thickness, said inside diameter increasing at a uniform rate from said point to said other end of said sleeve, said mandril body being formed with a cylindrical outside surface substantially complemental of the inside surface of said sleeve to prevent inward collapsing movement of all portions of said sleeve upon application of longitudinal compressive force thereto.

2. A fastener for firmly securing together workpieces of composite thickness ranging from a predetermined minimum to a predetermined maximum according to claim 1, wherein the uniform outside diameter of said sleeve is formed to fit within aligned openings in said workpieces so that longitudinal compressive force on said sleeve causes only radially outward collapsing of said sleeve between said point and said other end of said sleeve.

* * * * *